United States Patent [19]

Yorgensen

[11] 4,208,097
[45] Jun. 17, 1980

[54] REFLECTING TARGET FOR ELECTRONIC DISTANCE MEASURING

[75] Inventor: Phillip Yorgensen, Kemmerer, Wyo.

[73] Assignee: The Kemmerer Coal Company, Frontier, Wyo.

[21] Appl. No.: 943,147

[22] Filed: Sep. 18, 1978

[51] Int. Cl.² ............................................. G02B 5/14
[52] U.S. Cl. ..................................... 350/97; 350/105
[58] Field of Search ............... 33/DIG. 21, 267, 282, 33/285, 290, 267, 282, 46, 20 D; 350/97, 99, 1–10, 11, 105–109, 100, 136, 139, 292, 294, 306; D10/71; 356/2, 4, 8, 11; 343/785, 708

[56] References Cited

U.S. PATENT DOCUMENTS

| | | | |
|---|---|---|---|
| 2,646,638 | 7/1953 | Peterson | 350/105 |
| 2,866,971 | 12/1958 | Kelleher | 350/175 |
| 3,192,529 | 6/1965 | Chatelain | 343/708 |
| 3,252,376 | 5/1966 | De Vries | 350/105 |
| 3,274,888 | 9/1966 | Vanstrum et al. | 350/105 |
| 3,573,954 | 4/1971 | Yamamoto | 350/107 |
| 3,781,111 | 12/1973 | Fletcher et al. | 356/5 |

Primary Examiner—John K. Corbin
Assistant Examiner—B. Wm. de los Reyes
Attorney, Agent, or Firm—Frank P. Cyr

[57] ABSTRACT

A target is disclosed for intended use with light-emitting, including laser-emitting, electronic distance measuring equipment. The target includes a body having a substantially spherical surface to which a plurality of discrete multi-faceted return reflective elements are fixed. A plurality of guard pegs are interspaced between the reflective elements and extend outward from the surface of the body substantially beyond the outer surface of the reflective elements for protecting the reflecting surfaces from abrasion.

12 Claims, 5 Drawing Figures

REFLECTING TARGET FOR ELECTRONIC DISTANCE MEASURING

BACKGROUND OF THE INVENTION

1. Field of the Invention

The present invention relates generally to optical measuring and testing equipment, particularly distance measuring equipment, and even more particularly to reflectors for use with such equipment as a geometrical surveying instrument.

2. Description of the Prior Art

Typical light emitting and laser emitting electronic distance measuring equipment requires the use of an appropriate reflector to return the emitted beam to the instrument for proper measurement of distance. Typically, an amplitude modulated light or laser beam is emitted from the source measuring instrument. The modulated beam strikes the reflector and is returned to the instrument. The returning modulated beam is there converted to an electrical signal. The phase relationship between the transmitted and reflective beams are then compared by the instrument. The comparison of phase relationship is then converted by the instrument into a direct read out of distance.

Several inconveniences and problems have arisen when using present state of the art electronic distance measuring equipment with prior art reflecting devices. The prior art reflecting devices generally have required that they be aimed at the distance measuring instrument so as to properly return the light or laser beam to the instrument. This requires a manipulation of the reflecting surface which is often difficult and occasionally impossible. Further, many reflecting units have a certain maximum angle of vertical tilt which is permitted, typically between 30° and 45° from center to upper or lower limits. Any distances to be measured which include greater vertical angles than these maximum limits become much more difficult to perform. A particularly important example of this problem arises where it is desired to measure the depth of a rather deep narrow depression such as a trench. The vertical angle limits placed on certain prior art devices all but prevent this measurement from being performed.

Another problem encountered in prior art devices, particularly when used in geometrical surveying is the measurement of intermediate positions between the top and bottom of steep grades including cliffs. Where the grade is too steep, it is not possible for a person to position a rod or conventional reflecting device in certain spots without risking life and limb. While it is possible to calculate the distances to these intermediate positions by a series of triangulation methods, these measurements become very tedious and time consuming.

It is therefore a primary object of the present invention to construct a reflecting device with such a shape as to eliminate the present problem of having to aim the reflector back toward the light emitting distance measuring equipment. A further object is to construct such a device such that it can be employed in the measurement of angles with any horizontal or vertical angle. It is a further object of the present invention to construct a reflecting device which can be easily lowered down into deep narrow depressions or down steep grades to any intermediate point desired. It is further an object of the present invention to provide appropriate protection for the reflective surface to prevent abrasion damage which would degrade the quality of the return signal to the light emitting electronic distance measuring equipment.

SUMMARY OF THE INVENTION

A target according to the present invention, for use with light-emitting, including laser-emitting, electronic distance measuring equipment, comprises a body having a substantially spherical or bulbous surface. The body should be impact resistant yet reasonably lightweight. Examples of suitable materials performing the body would be any of the foamed plastics such as foamed polyurethanes, polyesters, polyisocyanates, silicone resins as well as foamed rubber or light weight metals such as aluminum.

The target further comprises a plurality of discrete multi-faceted return reflective elements fixed to the surface of the body. The term multi-faceted return reflective elements is intended to be a generic term to include multi-faceted corner reflectors such as disclosed in Stimson U.S. Pat. No. 2,022,639, bead reflectors such as disclosed in Eigenmann U.S. Pat. No. 3,781,083, and other similar devices. The functional character of the individual reflective elements must be such that it serves to reflect an impinging beam directly back to its source with only minimal dispersion and neglegible scattering of light.

The individual reflecting units may be round, square, triangular, or any other shape. Preferably, the plurality of reflecting units cover a major portion of the surface of the target. The individual reflecting units may be secured to the surface of the target by an adhesive backing or any other convenient means.

The target further comprises a plurality of guard means interspaced between the reflective elements extending outward from the surface of the body for protecting the reflecting surfaces from abrasion. One preferred guard means comprises a plurality of pegs or bumper rods protruding radially outward from the body of the target substantially beyond the outermost surface of the reflective elements. Another preferred guard means comprises a plurality of rings of elastomeric material, each ring encompassing the perimeter of a single reflective element and extending substantially beyond the outermost surface thereof. The guard means preferably consist of a durable and firm yet slightly flexible material such as various plastic resins, phenol-formaldehydes, urea formaldehyde, melamine formaldehyde, vinyl resins, silicone resins and rubber. A wide variety of choice is available and a compatible choice of guard means and bodies can easily be selected.

The target preferably further comprises an attachment means for attaching a line or rod to the body of the target so as to position the target during use. Other features of the present invention would become apparent to those skilled in the art upon consideration of the following discussion of a preferred embodiment of the invention together with the accompanying figures.

DESCRIPTION OF THE PREFERRED EMBODIMENT

Figure 1:
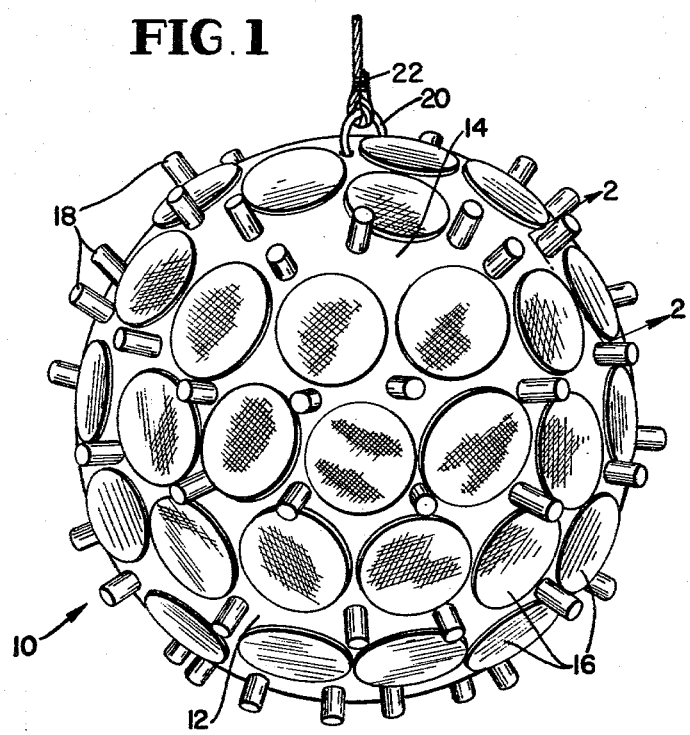
FIG. 1 is a perspective view of a target according to the present invention.

An embodiment of the present invention is illustrated in FIG. 1 which shows a perspective view of a target 10. The target 10 comprises a body 12 having a substantially spherical surface 14. A plurality of discrete multi-faceted return reflective elements 16 are fixed to the surface 14 of body 12. A plurality of guard means 18 are interspaced between the return reflectors 16 and extend outward from the surface 14 of body 12 so as to protect the return reflectors 16 from abrasion. An attachment means 20 attaches a line 22 to the body 12.

Figure 2:
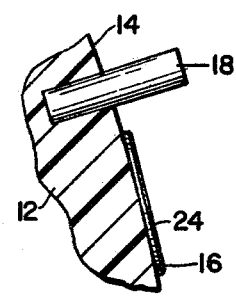
FIG. 2 is a sectional detail taken along line 2—2 of the target illustrated in FIG. 1.

The sectional detail of FIG. 2 illustrates the attachment of the return reflector 16 to the spherical surface 14 of body 12. The guard peg 18 extends radially outwardly from the surface 14 a substantial distance beyond the outermost surface 24 of the reflective element 16 so as to protect the surface 24 from abrasion. The guard means 18 is shown to extend a substantial distance below the surface 14 of body 12 into the interior of body 12 so as to strengthen the resistance of the guard peg 18 to bumps and scrapes which can be expected to be encountered during use.

Figure 3:
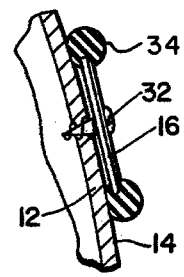
FIG. 3 is a sectional detail similar to that of FIG. 2 illustrating another embodiment of the present invention.

The sectional detail of FIG. 3 illustrates an alternative embodiment of the invention wherein the return reflector 16 is attached to the surface 14 of hollow body 12 by a screw fastener 32. An elastomeric ring 34 encompasses the reflector 16 and extends outwardly a substantial distance beyond the outermost surface 24 of the reflective element 16 thus protecting the surface 24 from abrasion. The guard ring 34 is secured adhesively to the reflector 16 and body 12, but can also be secured by an appropriate clip means (not illustrated).

Figure 4:
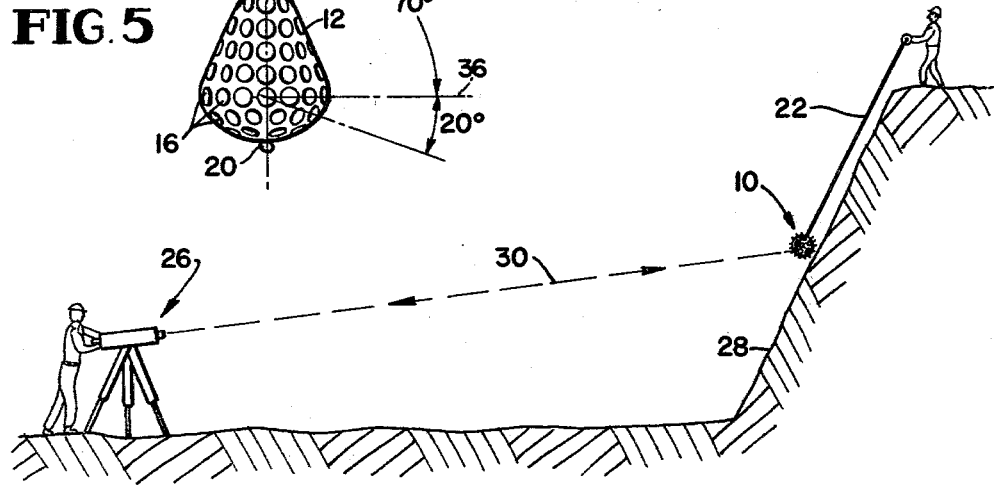
FIG. 4 is illustrative of one use of the present invention.

FIG. 4 illustrates the use of target 10 with a light emitting electronic distance measuring apparatus 26 to measure intermediate spots on a steep slope 28. The reflector 10 is lowered from the top of slope 28 with line 22. The presence of the plurality of return reflectors 16 on the spherical surface 14 of the target 10 eliminates any need to aim the reflector 10 at the electronic distance measuring equipment 26. The beam of light 30 emitted from the electronic distance measuring equipment 26 strikes the target 10 and is returned by one or more of the return reflectors 16 with neglegible dispersion of the light beam. It will be appreciated that a reflecting target 10 according to this invention can be used to perform essentially all of the functions that standard reflecting devices currently perform thus eliminating the need for a multitude of specialized reflecting surfaces for various particular uses.

Figure 5:
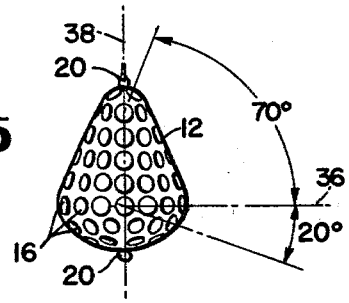
FIG. 5 is illustrative of another embodiment of the invention designed for specific angle ranges.

While specialized surfaces are not required, in particular circumstances, body shapes other than spherical can be employed. An example of a non-spherical body is illustrated in FIG. 5 where a bulbous or pear-shaped body 12 has affixed thereto a plurality of return reflectors 16. Attachment means 20 are present on both ends of the body 12 so that the reflector can be used with either end up. The particular pear or bulbous shape of the body 12 gives the reflector improved return reflecting characteristics between about −20° and +70° from a plane 36 passing through the largest diameter of the body perpendicular to the vertical axis of rotation 38. The improved characteristics can be employed in those circumstances where the required surveying is needed between the indicated angles of superior performance.

While the invention has been described herein with particular reference to preferred embodiments, it will be appreciated that certain modifications and changes can be made within the scope of the present invention as defined by the appended claims.

I claim:

1. A target for use with a light-emitting electronic distance measuring apparatus, the target comprising,
   a body having a generally spherical surface,
   a plurality of discrete multi-faceted return reflective elements fixed to the surface of the said body, and
   a plurality of discrete guard means interspaced between the said reflective elements and extending outward from the spherical surface of the body beyond the said reflective elements for protecting the reflective element surfaces from abrasion.

2. The target of claim 1 further comprising attachment means for attaching a line or rod to the body of the target to therewith manipulate the target.

3. The target of claim 1 wherein the plurality of reflective elements cover a major portion of the surface of the target.

4. The target of claim 1 wherein the plurality of reflective elements each further comprise an adhesive backing layer fixing the element to the body of the target.

5. The target of claim 1 wherein the guard means comprises a plurality of hard yet resilient pegs extending radially outward substantially beyond the outermost surface of the reflective elements.

6. The target of claim 1 wherein the guard means comprises a plurality of elastomeric rings, one encompassing the periphery of each reflective element and extending outward substantially beyond the outermost surface of the reflective element.

7. The target of claim 1 wherein the body is spherical.

8. The target of claim 1 wherein the body is bulbous.

9. The target of claim 1 wherein the body is constructed of foamed plastic.

10. The target of claim 1 wherein the body is hollow and constructed of a light weight metal.

11. A target for use with a light-emitting electronic distance measuring apparatus, the target comprising
    a lightweight shock resistant body having a substantially spherical surface,
    a plurality of discrete multi-faceted return reflective elements fixed to the surface of the body, the elements covering a major portion of the surface,
    a plurality of hard yet resilient guard pegs interspaced between the reflective elements and extending radially outward from the surface of the body substantially beyond the outermost surface of the reflective elements for protecting the reflecting elements from abrasion, and
    attachment means for attaching a line or rod to the body of the target to therewith manipulate the target.

12. A target for use with a light-emitting electronic distance measuring apparatus, the target comprising:
    a lightweight shock resistant body having a substantially pear-shaped surface,
    a plurality of discrete multi-faceted return reflective elements fixed to the surface of the body so as to exhibit superior reflecting characteristics over a preferred vertical angular range, a plurality of elastomeric rings, one encompassing each of the reflective elements and extending outward substantially beyond the outermost surface of each reflective element to protect the reflective element from abrasion, and attachment means fixed to each end of the body coincident with a major axis of rotation of the body for attaching a line or rod thereto and therewith manipulate the target.

* * * * *